United States Patent
Den et al.

(10) Patent No.: US 10,156,640 B2
(45) Date of Patent: Dec. 18, 2018

(54) RADIATION DETECTION APPARATUS AND RADIATION DETECTION SHEET

(71) Applicant: CANON KABUSHIKI KAISHA, Tokyo (JP)

(72) Inventors: Toru Den, Tokyo (JP); Yoshinori Shibutani, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 308 days.

(21) Appl. No.: 14/956,984

(22) Filed: Dec. 2, 2015

(65) Prior Publication Data

US 2016/0170042 A1    Jun. 16, 2016

(30) Foreign Application Priority Data

Dec. 10, 2014 (JP) ................ 2014-249706

(51) Int. Cl.
G01T 1/20    (2006.01)

(52) U.S. Cl.
CPC .............. *G01T 1/2002* (2013.01); *G01T 1/20* (2013.01); *G01T 1/2008* (2013.01); *G01T 1/2018* (2013.01)

(58) Field of Classification Search
CPC ....... G01T 1/2002; G01T 1/20; G01T 1/2008; G01T 1/2018
USPC ....................................... 250/361 R
See application file for complete search history.

(56) References Cited

U.S. PATENT DOCUMENTS

| | | |
|---|---|---|
| 7,538,330 B2 | 5/2009 | Nomura et al. |
| 7,692,152 B2 | 4/2010 | Inoue |
| 7,893,405 B2 | 2/2011 | Nagano et al. |
| 8,735,841 B2 | 5/2014 | Nakatsugawa et al. |

(Continued)

FOREIGN PATENT DOCUMENTS

| | | |
|---|---|---|
| EP | 2642320 A2 | 9/2013 |
| JP | 2007-232636 A | 9/2007 |

(Continued)

OTHER PUBLICATIONS

Albagli et al.: "Performance of Optimized Amorphous Silicon, Cesium-Iodide based Large Field-of-View Detector for Mammography", SPIE, vol. 5745, Apr. 30, 2005, XP040201076.*

(Continued)

*Primary Examiner* — David Porta
*Assistant Examiner* — Abra Fein
(74) *Attorney, Agent, or Firm* — Fitzpatrick, Cella, Harper & Scinto

(57) ABSTRACT

A radiation detection apparatus including a scintillator layer configured to convert radiation into light; a light sensor layer including a plurality of light sensors configured to detect light emitted from the scintillator layer; and a reflection layer configured to reflect light emitted from the scintillator layer. The scintillator layer is arranged between the light sensor layer and the reflection layer. The following condition is satisfied:

$$0.375 \leq (100-x)/(100-y(\%)) < 3.75$$

where the average conversion efficiency in a region of 25% of the thickness of the scintillator layer from a reflection layer side is set to 100 as a reference, x is the average conversion efficiency in a region of 25% of the thickness of the scintillator layer from a light sensor layer side, and y (%) is the reflectance of the reflection layer.

13 Claims, 2 Drawing Sheets

(56) References Cited

U.S. PATENT DOCUMENTS

| | | | |
|---|---|---|---|
| 9,040,927 B2* | 5/2015 | Kawata | G01T 1/2002 250/366 |
| 2007/0205371 A1 | 9/2007 | Inoue | |
| 2008/0083877 A1 | 4/2008 | Nomura et al. | |
| 2009/0200479 A1 | 4/2009 | Nomura et al. | |
| 2010/0144082 A1 | 6/2010 | Inoue | |
| 2010/0314547 A1* | 12/2010 | Kudo | G01T 1/20 250/368 |
| 2010/0317547 A1 | 12/2010 | Winter et al. | |
| 2011/0036985 A1 | 2/2011 | Inoue | |
| 2012/0193540 A1 | 8/2012 | Nakatsugawa et al. | |

FOREIGN PATENT DOCUMENTS

| | | | | |
|---|---|---|---|---|
| JP | 2008-51793 A | | 3/2008 | |
| JP | 2008051793 A | * | 3/2008 | G01T 1/2018 |
| JP | 2012-159393 A | | 8/2012 | |

OTHER PUBLICATIONS

European Search Report issued in European Application No. 15198591.8 dated Apr. 19, 2016 (9 pages).

Albagli, D. et al., "Performance of Optimized Amorphous Silicon, Cesium-Iodide based Large Field-of-View Detector for Mammography", Proceedings of SPIE, Medical Imaging 2005: Physics of Medical Imaging, vol. 5745, pp. 1078-1086 (2005).

Simon, M. et al., "X-Ray Imaging Performance of Scintillator-Filled Silicon Pore Arrays", Med. Phys., vol. 35, No. 3, pp. 968-981 (2008).

Office Action dated Feb. 13, 2018 in counterpart CN application No. 201510901200.9 (15 pages).

Office Action dated Sep. 8, 2018, in counterpart application No. JP 2014-249706 (12 pages).

* cited by examiner

RADIATION DETECTION APPARATUS AND RADIATION DETECTION SHEET

BACKGROUND OF THE INVENTION

Field of the Invention

The present invention relates to a radiation detection apparatus and a radiation detection sheet to be used for a medical image diagnostic apparatus, a nondestructive inspection apparatus, an analysis apparatus, or the like.

Description of the Related Art

With recent progress in CMOS technology using crystalline silicon and TFT technology using amorphous silicon or an oxide, various radiation detectors particularly including a two-dimensional flat panel sensor have been proposed, and a large-area high-speed digital detector has been under development also in a medical imaging field and a nondestructive inspection field.

The flat panel sensor allows an image to be instantaneously displayed on a display after or during irradiation of radiations. The flat panel sensor also allows the image to be extracted as digital information, and therefore has such a feature as to be convenient for archiving, processing, and transmitting data. Thus, the flat panel sensor has come to be widely used.

Particularly in the flat panel sensor used in the medical imaging field, a modulation transfer function (MTF) value characteristic, which reflects a resolving power, and a detective quantum efficiency (DQE) value, which indicates an S/N ratio, are key indices. Both values indicate that the flat panel sensor has more satisfactory characteristics as the values are larger, that is, are closer to 1.

The generally used flat panel sensor is of such a type as to convert radiation into light and then read the light with a light sensor to obtain an image. A layer configured to convert radiation into light like this is called "scintillator layer", and a GOS ($Gd_2O_2S:Tb$) sheet or a CsI (CsI:Tl) needle-shaped crystal film is generally used as the layer. The GOS sheet is obtained by processing a phosphor powder of $Gd_2O_2S:Tb$ together with an organic binder to have a sheet shape, and an Al reflection film is normally formed on a side opposite to a sensor side to improve a light emission luminance. As the CsI needle-shaped crystal film, a needle-shaped crystal film is used. The needle-shaped crystal film is obtained by co-depositing CsI and TlI, which is an activator to be an emission center, to grow a large number of CsI:Tl needle-shaped crystals. The needle-shaped crystal film is capable of efficiently propagating light in a needle-shaped crystal direction, which may lower a probability that the emitted light is blurred in a horizontal direction. In regard to the CsI needle-shaped crystal film, a method of directly growing the CsI needle-shaped crystal film on a light sensor and then forming an Al reflection film thereon or a method of, in contrast, growing the CsI needle-shaped crystal film on a substrate with a reflection film and then bonding the substrate to a light sensor base is employed.

In FIG. 2, a general radiation detection apparatus according to a related art is illustrated. Although not shown, in this case, a radiation source is present in an upper part of FIG. 2, that is, above a reflection layer 15 in FIG. 2. In FIG. 2, the reflection layer 15 is formed on a radiation source side of a scintillator layer 21 so as to be adjacent thereto, while a light sensor layer 16 obtained by arranging a plurality of light sensors 18 in a substrate 17 is formed on a side opposite to the radiation source. In FIG. 2, a protective layer for the light sensor or an adhesion layer between the respective layers is not shown.

In order to improve the DQE value, a method of raising the rate of stopping of radiation, namely, the absorptivity thereof by increasing the film thickness of the scintillator layer 21 is generally employed. However, as the scintillator layer 21 becomes thicker, the degree of diffusion of emitted light which is spread before reaching the sensor becomes higher, which leads to a problem of reduction in the MTF value.

On the other hand, in order to improve the MTF value, there is a method of reducing influence of scattered light by reducing the thickness of the scintillator layer 21. However, with this method, the stopping power for radiation is lowered, which results in reduction in the DQE value.

It should be understood that it is preferred that the radiation detection apparatus have a satisfactory MTF, namely, a large MTF, and a general method of improving the MTF is to reduce the thickness of the scintillator layer as described above. Such reduction allows the light sensor to detect the light before the light diffusion in the scintillator layer becomes considerable. However, with this method, the scintillator layer becomes thinner, which raises a problem in that X-rays are not sufficiently absorbed. When the absorption of the X-rays is insufficient, the DQE is lowered.

Further, as for another method of improving the MTF, in Japanese Patent Application Laid-Open No. 2008-51793, there is described a radiation detection apparatus having such a feature that the concentration of the activator is high on a radiation incident side and low on a light sensor side. Further, on the contrary, in Japanese Patent Application Laid-Open No. 2012-159393, there is disclosed a radiation image detection apparatus configured such that a region having a high activator concentration, in which the activator concentration is higher than the activator concentration in a region within a scintillator on a side opposite to a radiation incident side thereof, is formed in a position within the scintillator on the light sensor side thereof.

However, no technology relating to a method of improving the DQE is described in Japanese Patent Application Laid-Open No. 2008-51793 or disclosed in Japanese Patent Application Laid-Open No. 2012-159393.

SUMMARY OF THE INVENTION

According to an embodiment of the present invention, there is provided a radiation detection apparatus, including:

a scintillator layer configured to convert radiation into light;

a light sensor layer including a plurality of light sensors configured to detect light emitted from the scintillator layer; and a reflection layer configured to reflect light emitted from the scintillator layer, in which:

the scintillator layer is arranged between the light sensor layer and the reflection layer; and the following condition is satisfied:

$$0.375 \leq (100-x)/(100-y(\%)) < 3.75$$

where the average conversion efficiency in a region of 25% of the thickness of the scintillator layer from a reflection layer side is set to 100 as a reference, x is the average conversion efficiency in a region of 25% of the thickness of the scintillator layer from a light sensor layer side, and y (%) is the reflectance of the reflection layer.

According to another embodiment of the present invention, there is provided a radiation detection sheet, including:

a scintillator layer arranged on a substrate; and a reflection layer arranged on the scintillator layer, wherein radiation enters from a side of the reflection layer;

wherein a light sensor layer including a plurality of light sensors configured to detect light transmitted from the scintillator layer are arranged on a side of an opposite surface of the scintillator layer which opposite surface is opposite to a surface of the scintillator layer on which the reflection layer is arranged, thereby detecting the radiation; and wherein the following condition is satisfied:

$$0.375 \leq (100-x)/(100-y(\%)) < 3.75$$

where the average conversion efficiency in a region of 25% of the thickness of the scintillator layer from a reflection layer side is set to 100 as a reference, x is the average conversion efficiency in a region of 25% of the thickness of the scintillator layer from a light sensor layer side, and y (%) is the reflectance of the reflection layer.

Further features of the present invention will become apparent from the following description of exemplary embodiments with reference to the attached drawings.

DESCRIPTION OF THE EMBODIMENTS

Figure 1:
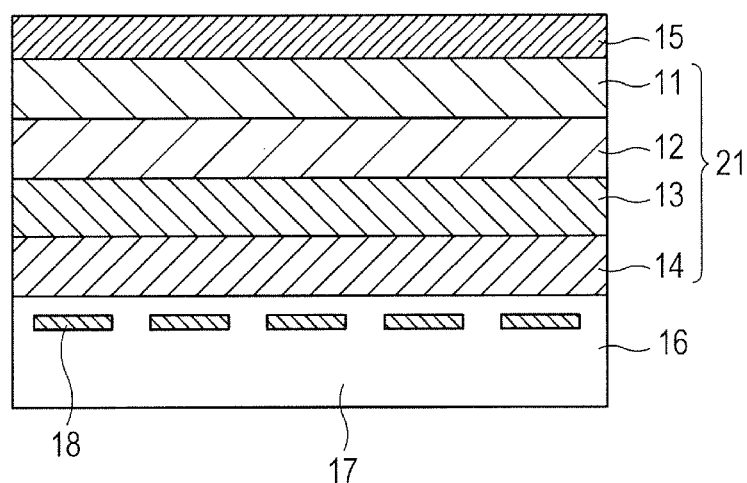
FIG. 1 is an illustration for illustrating a typical configuration of a radiation detection apparatus according to an embodiment of the present invention.
Figure 2:
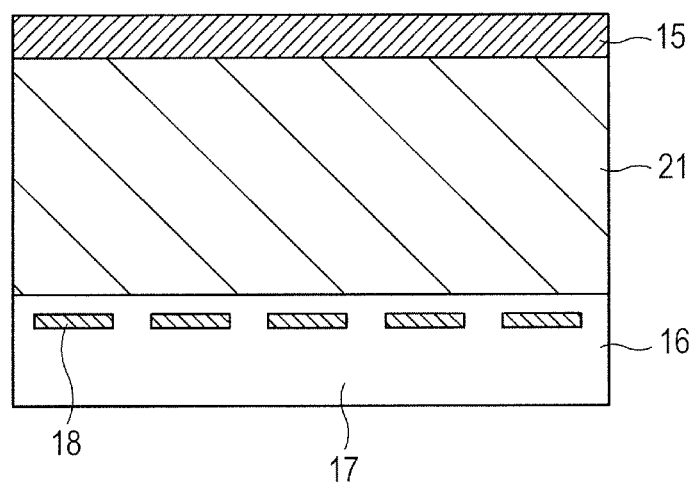
FIG. 2 is an illustration for illustrating a configuration of a general radiation detection apparatus according to a related art.

Preferred embodiments of the present invention will now be described in detail in accordance with the accompanying drawings.

A radiation detection apparatus according to an embodiment of the present invention includes a light sensor layer including a plurality of light sensors configured to detect light emitted from a scintillator layer; the scintillator layer configured to receive an incident radiation and convert the radiation into light; and a reflection layer configured to reflect light emitted from the scintillator layer, in the stated order. In other words, the scintillator layer is formed between the light sensor layer and the reflection layer. Note that the radiation is emitted on the reflection layer side. The scintillator layer has a distribution of conversion efficiency in a film thickness direction. The condition $0.375 \leq (100-x)/(100-y) < 3.75$ is satisfied, where the average conversion efficiency in a region of 25% the thickness of the scintillator layer from a radiation incident side (a reflection layer side) is set to 100 as a reference, x is the average conversion efficiency in a region of 25% the thickness of the scintillator layer from a light sensor layer side, and y (%) is the reflectance of the reflection layer. The inventors of the present invention have found that at least one of the MTF and the DQE improves without reduction in both of the MTF and the DQE when the decreasing rate of conversion efficiency (100−x) and the reflectance y of the reflection layer satisfy the above-described condition.

The conversion efficiency represents emission efficiency× light conversion efficiency (efficiency in converting light into electric signals). With the same emission spectrum, the light conversion efficiency is the same, and hence an increase or decrease of the conversion efficiency corresponds to an increase or decrease of the emission efficiency. The emission efficiency is proportional to the number of photons of light emitted for one radiation ray with a given amount of energy. The emission efficiency converted into a numerical value with a γ-ray of 1 MeV may be referred to as "light yield". Further, when the emission spectrum differs even with the same emission efficiency, the intensity of a signal to be induced by the light sensor also differs. This is because the sensitivity of the light sensor depends on the optical spectrum. From the above description, the conversion efficiency may be expressed as emission efficiency× light conversion efficiency.

In this embodiment, the average of the conversion efficiency in the region of 25% of the thickness of the scintillator layer from the radiation incident side (region within 25% from a surface on the radiation incident side in the layer thickness direction. For example, when the scintillator layer has a layer thickness of 100 μm, a layer assumed to have a thickness of 25 μm including a surface on the radiation detection element incident side is regarded as a region of 25% of the thickness from the radiation incident side) is standardized to be 100, to thereby define conversion efficiency in another region. Further, the decreasing rate of conversion efficiency means 100−x, where x is the average of the conversion efficiency in the region of 25% of thickness of the scintillator layer from the light sensor layer side (region within 25% from a surface on the light sensor layer side in the layer thickness direction).

The conversion efficiency may be measured by several methods. For example, there may be employed a method involving cutting out a region whose conversion efficiency is to be measured from the radiation incident side by such a method as grinding, cutting, or the like, irradiating the cut-out scintillator with radiation, and conducting a measurement with a light sensor. Further, there may be employed a method in which the fact that there is a substantially linear correlation in emission amount between radiation excitation and ultraviolet excitation may be used and which involves cutting out the scintillator layer in a cross sectional direction, irradiating a cross section obtained by the cutting with an ultraviolet ray under a microscope, and measuring the emission amount with the microscope.

The methods of measuring the average conversion efficiency in the regions of 25% of the thickness from the radiation incident side and the light sensor layer side according to this embodiment are described more specifically.

(1) Only the region of 25% of the thickness from the surface on the radiation incident side (or light sensor layer side) is extracted. An extraction method therefor may be such a method as grinding, cutting, or the like, or a scintillator formed by depositing only the region of 25% of the thickness may be used. It is preferred that the size of the sample be equal to or larger than 5 mm×5 mm.

(2) The cut-out scintillator film is placed above the light sensor, and is irradiated with desired X-rays, to measure the luminance. The wording "desired" used herein represents an X-ray spectrum used for an X-ray image pickup, which is exemplified by RQA5 or the like listed in the IEC standard in the medical field. Further, instead of the measurement conducted immediately above the light sensor, the quantity of light emitted through an optical fiber may be measured. It is preferred that the measurement be conducted three times or more, and in that case, a simple average of measured values is obtained to be set as the average conversion efficiency.

The reflectance y of the reflection layer may be measured with a reflectance measuring instrument. When a protective layer or an adhesion layer is formed on a scintillator side of the reflection layer, the reflectance is obtained including the protective layer or the adhesion layer in the measurement.

A typical configuration of the radiation detection apparatus according to the embodiment of the present invention is described with reference to FIG. 1. In FIG. 1, the scintillator layer 21 is divided into four scintillator sub layers 11, 12, 13, and 14 formed in the stated order from above, that is, from the radiation incident side. The respective scintillator sub layers may be formed of different materials, or may be formed of the same material. In this case, a configuration in which the four scintillator sub layers are formed of a CsI:Tl needle-shaped crystal film is described as an example. The radiation detection apparatus is designed so that the concentration of Tl to be an emission center decreases and the emission efficiency decreases in the order of from the scintillator sub layer 11 to the scintillator sub layer 14. In FIG. 1, a reflection layer 15 is formed above the scintillator layer 21, while, on a side opposite thereto, a light sensor layer 16 is formed which is obtained by arranging a plurality of light sensors 18, which are configured to detect the light emitted from the scintillator, in a substrate 17. In FIG. 1, a protective layer for the light sensor, an adhesion layer between the respective layers and the like are omitted.

As the light sensor in this embodiment, any light sensor configured to receive light from the scintillator and convert the light into electric signals may be used. For example, a linear light sensor, an area light sensor, or the like may be used. Further, a CCD or a CMOS sensor may be used in addition to a sensor based on a method of reading an array of general photodiodes by matrix driving or the like. For the light sensor, amorphous silicon or crystalline silicon is often used.

In this embodiment, as a substrate for arranging the light sensors, glass or Si is generally used, but the material is not limited thereto as long as a desired radiation detection apparatus is obtained.

Further, an adhesion layer or a protective layer made of polyimide, SiN, SiO2, or the like may be formed between the scintillator layer and the light sensor layer, and the material is not limited thereto. Further, the same material may be used between the scintillator layer and the reflection layer. A substrate or a protective layer is normally present on the radiation incident side of the reflection layer. It is preferred that the substrate be made of a material that easily transmits radiation, and, for example, an organic material such as a carbon-based material, aluminum, or polyimide may be used. However, in the embodiment of the present invention, the reflectance y of the reflection layer is defined on the assumption that a layer formed between the scintillator layer and the reflection layer is also a part of the reflection layer. Further, in some cases, a grid configured to block scattered X-rays may be used between a radiation detector and an X-ray source.

Incidentally, the radiation detector according to this embodiment is particularly effective in an energy region of the X-ray (10 keV or higher and 150 keV or lower) among the radiation rays. However, in the present invention and in this specification, the radiation includes radiations such as a γ-ray in addition to the X-ray.

In order to describe this embodiment, a simulation is used to describe below how the DQE and the MTF change depending on changes of the decreasing rate of emission efficiency (100−x) and the reflectance y of a reflection film.

Preconditions for Simulation

The light sensor has 256×256 pixels in its entirety with a pixel pitch of 100 µm. Light sensor noise is negligibly small. The scintillator includes CsI as a main component, and the overall layer thickness of the scintillator layer is 640 µm. This value presupposes a filling factor of 100%, and corresponds to 800 µm when the filling factor of a needle-shaped crystal is 80%. The scintillator layer is formed of four scintillator sub layers, each of which has a thickness of 160 µm. The reflection layer having a reflectance of y % is formed above the scintillator layer.

The radiation and the scintillator emit light through photoelectric conversion. The emitted light is propagated vertically through the scintillator layer, and the spread of the propagation is expressed by a point spread function (PSF) of the light that has reached a light sensor surface. It is assumed that the PSF is able to be expressed by a Gaussian distribution, and a half-value width W of the PSF is able to be expressed by the following expression.

$$W = 0.4 \times L^{0.5} \quad \text{(Expression 1)}$$

In the expression, L represents a distance (mm) between the light emitting point and the light sensor surface.

Figure 3:
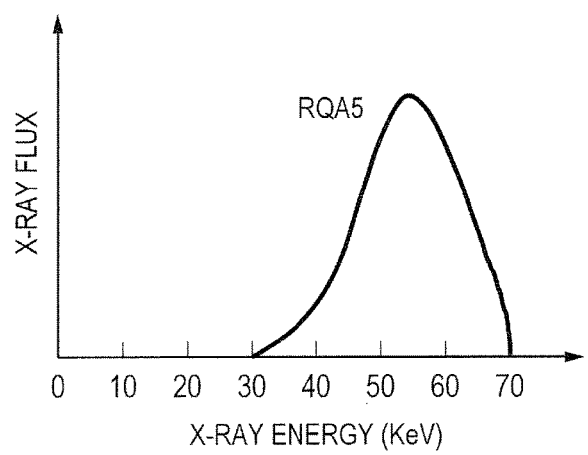
FIG. 3 is a graph for indicating an X-ray spectrum used for a simulation of the radiation detection apparatus.

It is assumed that each pixel is irradiated with 1,600 radiation rays on average. The radiation rays used for the calculation are X-rays, and the standard X-ray spectrum called RQA5 is used. The spectrum is indicated in FIG. 3. The X-rays are distributed within an energy range of approximately 30 keV to approximately 70 keV.

It is assumed that the scintillator exhibits a light emission intensity corresponding to the energy. In other words, it is assumed that, in a case where 1 photon corresponding to the X-rays of 60 keV is all converted into light emission, twice as many photons are generated as in a case where 1 photon corresponding to the X-rays of 30 keV is all converted into light emission. This is an approximately correct phenomenon observed in a general scintillator.

Figure 4:
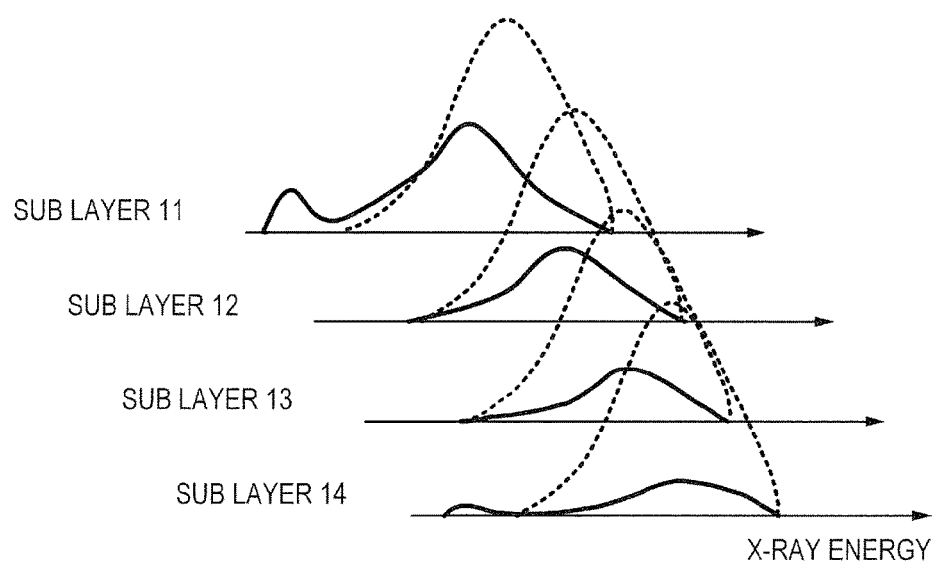
FIG. 4 is a graph for indicating a distribution of X-ray energy absorbed in each of the scintillator sub layers.

When the X-rays are absorbed, characteristic X-rays are generated and scattered. Herein, for the sake of brevity, assuming that the scattering of the X-rays is sufficiently small, the probability that the characteristic X-rays are generated to escape, that is, to exit to the outside of a system, is calculated with only the scintillator sub layers 11 and 14 illustrated in FIG. 1. It is assumed that, when the characteristic X-rays exit to the outside of the system, the remaining energy can be converted into light through the photoelectric conversion. It is assumed that the other characteristic X-rays again cause the photoelectric conversion at a position where the photoelectric conversion is first caused. The probability that the characteristic X-rays are generated is set to 89% when the X-rays having energy equal to or higher than that at the absorption edge are emitted. The remaining 11% is assumed to cause energy relaxation due to emission of Auger electrons. Then, as indicated in FIG. 4, a distribution of energy absorbed in each of the scintillator sub layers 11 to 14 is indicated by the solid line.

The emitted light may be absorbed in the inside of the scintillator layer, the adhesion layer, or the like, but such absorption is ignored in this case.

In regard to the calculation of the MTF, the MTF is obtained by irradiating one pixel with the X-rays having the spectrum of RQA5 and subjecting the PSF to a Fourier transform, the PSF being an in-plane distribution obtained by summing up the light emitted by the respective scintillator sub layers and propagated to reach a sensor surface. In regard to the calculation of the DQE, the DQE is obtained by calculating a normalized noise power spectrum (NNPS)

obtained when an entire surface of the sensor is irradiated with the X-rays having the spectrum of RQA5.

As an example, the X-ray is used as the radiation, and the DQE and the MTF of a radiation sensor configured such that the X-ray source, the reflection layer, the scintillator layer, and the light sensor layer are formed in the stated order are calculated by the above-mentioned methods.

In order to obtain the DQE and the MTF to be references, the calculation is conducted for a case where the conversion efficiency is uniform in the film thickness direction of the scintillator layer (with the decreasing rate of conversion efficiency being 0%). Further, the conversion efficiency of the scintillator sub layer (first sub layer) formed in a position closest to the radiation incident side is set to 100, and the calculation is conducted for an exemplary case where the conversion efficiency of the respective scintillator sub layers from the first sub layer to the fourth sub layer is set to 100, 90, 80, and 70 in the order of from the first sub layer (with the decreasing rate of conversion efficiency being 30%), an exemplary case where the conversion efficiency is set to 100, 80, 60, and 40 (with the decreasing rate of conversion efficiency being 60%), an exemplary case where the conversion efficiency is set to 100, 75, 50, and 25 (with the decreasing rate of conversion efficiency being 75%), and an exemplary case where the conversion efficiency is set to 100, 70, 40, and 10 (with the decreasing rate of conversion efficiency being 90%). Further, in regard to the respective cases, the calculation is conducted for five kinds of reflectances y, that is, 100%, 80%, 50%, 20%, and 0%.

As for the results obtained under the above-mentioned conditions, the values of the DQE are collectively shown in Table 1, and the values of the MTF are collectively shown in Table 2. In this case, the values of the DQE and the MTF indicate values for 2 LP/mm as a typical example. The "LP" stands for "line pair".

TABLE 1

DQE (2LP/mm)

| | | Decreasing rate of conversion efficiency (100 − x) | | | | |
|---|---|---|---|---|---|---|
| | | 0 | 30 | 60 | 75 | 90 |
| Reflectance y % | 100 | 0.821 | 0.847 | 0.848 | 0.835 | 0.809 |
| | 80 | 0.813 | 0.844 | 0.851 | 0.839 | 0.813 |
| | 50 | 0.797 | 0.836 | 0.853 | 0.845 | 0.821 |
| | 20 | 0.774 | 0.823 | 0.852 | 0.849 | 0.829 |
| | 0 | 0.752 | 0.809 | 0.848 | 0.851 | 0.833 |

TABLE 2

MTF (2LP/mm)

| | | Decreasing rate of conversion efficiency (100 − x) | | | | |
|---|---|---|---|---|---|---|
| | | 0 | 30 | 60 | 75 | 90 |
| Reflectance y % | 100 | 0.31 | 0.305 | 0.3 | 0.297 | 0.294 |
| | 80 | 0.322 | 0.317 | 0.31 | 0.307 | 0.303 |
| | 50 | 0.347 | 0.34 | 0.331 | 0.326 | 0.321 |
| | 20 | 0.385 | 0.375 | 0.363 | 0.356 | 0.348 |
| | 0 | 0.423 | 0.41 | 0.394 | 0.385 | 0.376 |

In this case, as described above, the decreasing rate of conversion efficiency means 100−x when the average conversion efficiency per unit radiation intensity in the region of 25% of the thickness of the scintillator layer from the radiation incident side is set to 100 and when the average conversion efficiency per unit radiation intensity in the region of 25% of the thickness of the scintillator layer from the light sensor layer side is set to x. However, in this simulation, the first sub layer on an X-ray incident side is set to 100 as a reference of standardization. That is, it is assumed that the region of 25% of the thickness from the radiation incident side is present within the first sub layer. The wording "per unit radiation intensity" may relate to, for example, 1 photon of an X-ray of 50 keV or X-rays having other energy. However, it is desirably close to X-ray energy to be used in actuality.

As a result, it is understood that, with a general radiation detector having a decreasing rate of 0 of conversion efficiency, the DQE decreases and the MTF improves as the reflectance decreases. The following are considered as the reasons. Specifically, when the reflectance decreases, noise increases and thus the DQE decreases, because the signal of the X-ray that have caused photoelectric conversion is emphasized in a vicinity of the sensor. Also, the rate of that light emission blurred due to reflection which reaches the sensor decreases and thus the MTF improves.

On the other hand, in a case where the conversion efficiency is controlled to allow the scintillator layer to have decreasing rate of conversion efficiency, it is understood that the DQE improves when the conversion efficiency is moderately lowered. The MTF decreases as the conversion efficiency decreases, but there has been found a region in which both the MTF and the DQE improve when the reflectance is moderately lowered along with a decrease in the conversion efficiency. Note that a comparison target is a radiation detector (DQE: 0.821 and MTF: 0.31) having a decreasing rate of conversion efficiency of 0% and a reflectance of 100%. Specifically, the DQE improves in the range of the reflectance of from 20% to 100% when the decreasing rate of conversion efficiency is 30%, the DQE improves irrespective of the reflectance when the decreasing rate of conversion efficiency is from 60% to 75%, and the DQE improves with the reflectance smaller than 50% when the decreasing rate of conversion efficiency is 90%. On the other hand, in regard to the MTF, the MTF improves with the reflectance equal to or smaller than 80% when the decreasing rate of conversion efficiency is from 30% to 60%, and the MTF improves with the reflectance equal to or smaller than 50% when the decreasing rate of conversion efficiency is from 75% to 90%. From the above findings, both the MTF and the DQE improve with a reflectance equal to or larger than 20% and equal to or smaller than 80% when the decreasing rate of conversion efficiency is 30%, and both the MTF and the DQE improve with a reflectance equal to or smaller than 80% when the decreasing rate of conversion efficiency is 60%. In the same manner, both the MTF and the DQE improve with a reflectance equal to or smaller than 50% when the decreasing rate of conversion efficiency is 75%, and both the MTF and the DQE improve with a reflectance smaller than 50% when the decreasing rate of conversion efficiency is 90%. In addition, when the decreasing rate of conversion efficiency is 90%, the MTF improves with a reflectance of 50% while the DQE is being maintained.

The above conditions are summarized with numerical expressions. When the decreasing rate of conversion efficiency is 30%, the range of decreasing rate of conversion efficiency/(100−reflectance (%)) within which both the MTF and the DQE improve is equal to or larger than 30/80=0.375 and equal to or smaller than 30/20=1.5. Further, when the decreasing rate of conversion efficiency is 60%, the range of decreasing rate of conversion efficiency/(100−reflectance (%)) within which both the MTF and the DQE improve is equal to or larger than 60/100=0.6 and equal to or smaller than 60/20=3.0. Further, when the decreasing rate of conversion efficiency is 75%, the range of decreasing rate of conversion efficiency/(100−reflectance (%)) within which both the MTF and the DQE improve is equal to or larger than 75/100=0.75 and equal to or smaller than 75/50=1.5. Further, when the decreasing rate of conversion efficiency is 90%, the range of decreasing rate of conversion efficiency/(100−reflectance (%)) within which both the MTF and the DQE improve or the MTF improves while the DQE is being maintained is equal to or larger than 90/100=0.9 and equal to or smaller than 90/50=1.8. Further, the DQE improves with a reflectance of 20% when the decreasing rate of conversion efficiency is 30%, and hence it is considered that both the MTF and the DQE improve when decreasing rate of conversion efficiency/(100−reflectance (%)) is equal to or larger than 0.375. On the other hand, when the decreasing rate of conversion efficiency is 75%, the decreasing amount of the MTF with the reflectance of 80% is low, and hence it is considered that, when the decreasing rate of conversion efficiency is 75%, the MTF is not lowered either with the reflectance smaller than 80%. Therefore, it is considered that, when decreasing rate of conversion efficiency/(100−reflectance (%)) is smaller than 3.75, both the MTF and the DQE improve or the DQE improves with the MTF being maintained.

From the above description, it is understood that, by establishing 0.375≤decreasing rate of conversion efficiency/(100−reflectance (%))<3.75, both the MTF and the DQE improve or the DQE improves with the MTF being maintained. Further, it is understood that, by establishing 0.375≤decreasing rate of conversion efficiency/(100−reflectance (%))<3.0, both the MTF and the DQE improve.

Note that, it is more preferred to set decreasing rate of conversion efficiency/(100−reflectance (%)) to be equal to or smaller than 1.8, and it is further preferred to set decreasing rate of conversion efficiency/(100−reflectance (%)) to be equal to or smaller than 1.5.

When the above-mentioned understanding is applied to a (CsI:Tl) scintillator layer with CsI used as a base material and with Tl used as an emission center (activator), it is preferred that the Tl concentration on the radiation incident side be set to approximately 1 mol % (±0.3 mol %), and that the Tl concentration on the light sensor layer side be set to equal to or smaller than approximately 0.3 mol % and equal to or larger than approximately 0.02 mol %. In this manner, when the scintillator layer is CsI:Tl in an embodiment of the present invention, it is preferred that the concentration of Tl be 1±0.3 mol % in at least a part of the region of 25% of the thickness from the radiation incident side, and that the concentration of Tl be equal to or larger than 0.02 mol % and equal to or smaller than 0.3 mol % in at least a part of the region of 25% of the thickness from the light sensor layer side. As for a specific method of carrying out the above condition, such a method is used that in a case where the scintillator layer is formed through deposition, both the Tl concentration and the emission efficiency decrease as X is decreased when, for example, a crucible containing CsI is maintained at 715° C. and a crucible containing TlI is maintained at X° C. For example, assuming that the concentration becomes 2 mol % when X is 300° C., and then when the emission efficiency exhibited at this time is set to 1 (this emission efficiency being set as a reference), the concentration becomes 0.4 mol % with an emission efficiency of 0.8 at 250° C., 0.05 mol % with an emission efficiency of 0.6 at 200° C., and 0.02 mol % with an emission efficiency of 0.4 at 175° C. However, the relationship between the concentration and the emission efficiency is also influenced by the temperature of the substrate.

Note that an example in which the scintillator layer is formed of four scintillator sub layers with different emission efficiencies is described above, but the present invention is not limited thereto, and the scintillator layer configured to have an emission efficiency gradually changing in the film thickness direction may be employed. For example, the emission efficiency gradually improves as the temperature of a crucible containing the emission center is gradually increased during deposition, and on the contrary, the emission efficiency gradually decreases as the temperature of the crucible containing the emission center is gradually decreased during deposition. In this manner, even when the scintillator sub layer has the emission efficiency gradually changing and is not clearly divided, the emission efficiency in the region having a thickness of 25% from the radiation incident side can be measured by extracting the region of 25% of the thickness from the radiation incident side. The same applies to the emission efficiency in the region of 25% of the thickness from the light sensor layer side.

An example of using Tl as the emission center is described above, but In may be used in place of Tl (CsI:In). Also in this case, the lowering of the emission efficiency may be achieved by lowering a concentration of In to be added.

Further, when the amount of reduction of the emission efficiency is increased or when the reflectance is greatly lowered, the amount of light to reach the sensor decreases. Depending on the light sensor, it may be disadvantageous to reduce the light amount too much when the sensor noise is relatively large. Therefore, it is preferred that the decreasing rate of conversion efficiency (100−x) be equal to or smaller than 30%. Further, it is preferred that the reflectance y be equal to or larger than 20%, and it is further preferred that the reflectance y be equal to or larger than 50%. Note that the above-mentioned simulation has confirmed that both the MTF and the DQE improve by establishing 0.375≤(100−x)/(100−y)≤1.5 when the decreasing rate of conversion efficiency is equal to or smaller than 30%.

Further, the same effects apply to scintillators of any kind, and may be produced by, for example, a CsBr-based or RbI-based scintillator.

The radiation detection apparatus according to an embodiment of the present invention is more effective for a detection apparatus of an integrating type configured to integrate signals during a certain time period and then digitizing a result of integration thereof than for a detection apparatus of a photon counting system configured to count radiation rays one by one.

A radiation detection sheet having a sheet shape can be manufactured by forming the above-mentioned scintillator layer on the substrate and the reflection layer further above the scintillator layer. Such a radiation detection sheet may be used in such a manner that the scintillator layer of the radiation detection sheet is bonded to a panel of a light sensor to manufacture a radiation detection apparatus or that the scintillator layer can be used to be subjected to imaging using a lens optical system.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-249706, filed Dec. 10, 2014, which is hereby incorporated by reference herein in its entirety.

What is claimed is:

1. A radiation detection apparatus comprising:
a scintillator layer configured to convert radiation into light;
a light sensor layer comprising a plurality of light sensors configured to detect light emitted from the scintillator layer; and
a reflection layer configured to reflect light emitted from the scintillator layer,
wherein the scintillator layer is arranged between the light sensor layer and the reflection layer; and
wherein the following condition is satisfied:

$$0.375 \leq (100-x)/(100-y(\%)) < 3.75$$

where the average conversion efficiency in a region of 25% of the thickness of the scintillator layer from a reflection layer side is set to 100 as a reference, x is the average conversion efficiency in a region of 25% of the thickness of the scintillator layer from a light sensor layer side, and y (%) is the reflectance of the reflection layer.

2. The radiation detection apparatus according to claim 1, wherein a scintillator base material of the scintillator layer comprises cesium iodide;
wherein an emission center of the scintillator layer comprises thallium;
wherein a concentration of the thallium is 1±0.3 mol % in at least a part of the region of 25% of the thickness of the scintillator layer from the reflection layer side; and
wherein the concentration of the thallium is equal to or larger than 0.02 mol % and equal to or smaller than 0.3 mol % in at least a part of the region of 25% of the thickness of the scintillator layer from the light sensor layer side.

3. The radiation detection apparatus according to claim 1, wherein a scintillator base material of the scintillator layer comprises cesium iodide; and
wherein an emission center of the scintillator layer comprises indium.

4. The radiation detection apparatus according to claim 1, wherein when 100−x is a decreasing rate of conversion efficiency, the decreasing rate of conversion efficiency is equal to or smaller than 30%.

5. The radiation detection apparatus according to claim 1, wherein the reflectance of the reflection layer is equal to or larger than 20%.

6. The radiation detection apparatus according to claim 5, wherein the reflectance is equal to or larger than 50%.

7. The radiation detection apparatus according to claim 1, wherein the radiation comprises an X-ray.

8. The radiation detection apparatus according to claim 1, wherein the scintillator layer includes a base material and an activator,
wherein the scintillator layer is divided into four scintillator sub-layers, each of the sub-layers including the activator in a different concentration, and
wherein the concentration of the activator in one of the scintillator sub-layers is higher than that of another scintillator sub-layer arranged nearer to the light sensor layer in comparison with the sub-layer.

9. The radiation detection apparatus according to claim 8, wherein the concentration of the activator in the scintillator layer decreases from the scintillator layer near the reflection layer to the scintillator layer near the light sensor layer.

10. The radiation detection apparatus according to claim 1, wherein the average conversion efficiency is from 60% to 90% and the reflectance is 20% to 80%.

11. A radiation detection sheet comprising:
a scintillator layer arranged on a substrate; and
a reflection layer arranged on the scintillator layer,
wherein radiation enters from a side of the reflection layer;
wherein a light sensor layer including a plurality of light sensors configured to detect light transmitted from the scintillator layer are arranged on a side of an opposite surface of the scintillator layer which opposite surface is opposite to a surface of the scintillator layer on which the reflection layer is arranged, thereby detecting the radiation; and
wherein the following condition is satisfied:

$$0.375 \leq (100-x)/(100-y(\%)) < 3.75$$

where the average conversion efficiency in a region of 25% of the thickness of the scintillator layer from a reflection layer side is set to 100 as a reference, x is the average conversion efficiency in a region of 25% of the thickness of the scintillator layer from a light sensor layer side, and y (%) is the reflectance of the reflection layer.

12. The radiation detection apparatus according to claim 11, wherein the scintillator layer includes a base material and an activator,
wherein the scintillator layer is divided in to four scintillator sub-layers, each of the sub-layers including the activator in a different concentration, and
wherein the concentration of the activator in one of the scintillator sub-layers is higher than that of another scintillator sub-layer arranged nearer to the light sensor layer in comparison with the sub-layer.

13. The radiation detection apparatus according to claim 12, wherein the concentration of the activator in the scintillator layer decreases from the scintillator layer near the reflection layer to the scintillator layer near the light sensor layer.

* * * * *